United States Patent [19]

Aoki et al.

[11] Patent Number: 4,773,472

[45] Date of Patent: Sep. 27, 1988

[54] CONTROL DEVICE FOR A REFRIGERATING APPARATUS OF A VENDING MACHINE

[75] Inventors: Kazumi Aoki, Gunma; Minoru Fujiu, Omama, both of Japan

[73] Assignee: Sanden Corporation, Gunma, Japan

[21] Appl. No.: 56,758

[22] Filed: Jun. 2, 1987

[30] Foreign Application Priority Data

Feb. 6, 1986 [JP] Japan ............................... 61-125911

[51] Int. Cl.⁴ .............................................. F24F 3/00
[52] U.S. Cl. ....................................... 165/22; 62/204; 236/78 A
[58] Field of Search ............... 62/204, 203, 200; 165/22; 236/78 A, 78 B

[56] References Cited

U.S. PATENT DOCUMENTS 4,439,998  4/1984  Horvay et al. .................. 62/200 X
4,510,767  4/1985  Komatsu et al. ................ 62/204 X

FOREIGN PATENT DOCUMENTS 2143342  2/1985  United Kingdom .................. 165/22

*Primary Examiner*—William E. Wayner
*Attorney, Agent, or Firm*—Banner, Birch, McKie & Beckett

[57] ABSTRACT

A temperature control device is disclosed for use in a vending machine having a plurality of storage chambers. The temperature control device includes a refrigerating apparatus provided with a plurality of evaporators which are connected in parallel and disposed individually in the storage chambers. A plurality of electromagnetic valves are coupled in series with the evaporators to control the inflow of refrigerant fluid. The operation of each electromagnetic valve, i.e., the temperature control in each storage chamber is controlled by a comparison of the average temperature of the storage chambers with the actual temperature in each chamber. The operation of the refrigerating apparatus and the electromagnetic valves are also controlled by a comparison between the desired temperature and the actual temperature in each chamber.

6 Claims, 4 Drawing Sheets

CONTROL DEVICE FOR A REFRIGERATING APPARATUS OF A VENDING MACHINE

BACKGROUND OF THE INVENTION

This invention relates to a control device of a refrigerating apparatus, and more particularly, to a control device ofa refrigerating apparatus for a vending machine which has a plurality of storage chambers.

To meet the variety of consumer tastes, vending machines must store and dispense various types of merchandise, each of which may need to be stored at a different temperature. FIG. 1 illustrates such a vending machine 1, the machine being divided internally into a plurality of storage chambers 1a,1b and 1c for storing different types of merchandise, and includes a refrigerating apparatus and heating devices 5a, 5b and 5c for controlling the temperature in each of the chambers.

The main refrigeration components, such as compressor 9 and condenser 7, are disposed in a chamber 2 formed below the storage chambers and are ventilated by a blower or fan 8. Some of the refrigeration components such as evaporators 3a,3b, and 3c, are disposed in storage chambers 1a, 1b, and 1c, respectively, to refrigerate each chamber. These refrigerating components are coupled in series to form a closed refrigerant circuit as shown in FIGS. 2a and 2b. Referring again to FIG. 1, air is circulated in each of the chambers 1a,1b and 1c by a blowers or fans 4a,4b and 4c. The refrigerating temperature in each storage chamber is controlled by thermostats 6a,6b and 6c, and the heating temperature is controlled by thermostats 6d,6e and 6f.

As shown in FIG. 2a, evaporators 3a,3b and 3c are connected in series with electromagnetic valves 10a,10b and 10c and the resulting evaporator-electromagnetic valve combinations are connected in parallel. These parallel combinations are connected in series with compressor 9, condenser 7, capillary tube 12 and accumulator 11. Electromagnetic valves 10 control the refrigerant flow and capillary tube 12 functions as an expansion valve or decompression device. Alternatively, as shown in FIG. 2b, the parallel combination may include capillary tubes 12a,12b, and 12c instead of capillary tube 12 shown in FIG. 2a.

In the above refrigerating circuit, the elements combined in parallel are connected to the circuit in series through distributor 13, shown in more detail in FIG. 3.

One problem associated with the use of a device such as distributor 13 is that the flow of fluid may not be uniform through each of the branches in the parallel network. As a result, the refrigerating efficiency in evaporators 3a,3b and 3c may not be properly balanced. This unequal flow of refrigerant may result in the temperature of one of the chambers remaining above the predetermined level. FIG. 4 illustrates such a result, where the temperature in chamber 1c remains above a predetermined level. An unequal flow of refrigerant causes extended operation of the refrigerating apparatus which increases the operating cost of the vending machine and necessitates a compressor with a large capacity.

SUMMARY OF THE INVENTION

It is a primary object of this invention to provide a control device for a refrigerating apparatus of a vending machine which can efficiently and accurately maintain the temperature within storage chambers of the vending machine.

It is another object of this invention to provide a control device for a refrigerating apparatus of a vending machine which is able to adjust the flow of refrigerant in each evaporator in the event of unequal flow in the system.

It is still another object of this invention to provide a control device for a refrigerating apparatus of a vending machine which can be utilized in existing vending machines.

A temperature control means is provided for a refrigerating apparatus used to cool a plurality of storage chambers contained within a vending machine. The refrigerating apparatus comprises a compressor, a condenser, an evaporator disposed in each of the storage chambers, a plurality of valve devices corresponding to the number of evaporators, and an expansion device. The refrigeration components are connected in series to form an enclosed refrigerating circuit adapted to refrigerate each of the storage chambers individually in accordace with the temperature requirements of the merchandise to be stored therein. Each of the valve devices is controlled by a control device which includes a plurality of temperature detecting sensors disposed in each of the storage chambers. The control device also comprises a circuit for adding the output voltage from each of the temperature detecting sensors, a voltage averaging circuit to output the average voltage of the temperature detecting sensors, and a differential amplification circuit to amplify the potential difference between the output voltage from the voltage averaging circuit and the output voltage from the temperature detecting sensors. A first comparison amplification circuit compares the output voltage of the differential amplification circuit with a reference voltage and generates a control signal to each valve device. A second comparison amplification circuit compares the output voltage from the temperature detecting sensors with a predetermined voltage related to the predetermined temperature for each storage chamber and generates a control signal to each valve device and the compressor. A driving circuit operates at least the valve device in accordance with the output signals from the first and second comparison amplification circuits.

Further objects, features and advantages of this invention will be understood from the following detailed description of the preferred embodiment of the invention with reference to the attached drawings.

DETAILED DESCRIPTION OF A PREFERRED EMBODIMENT

Figure 1:
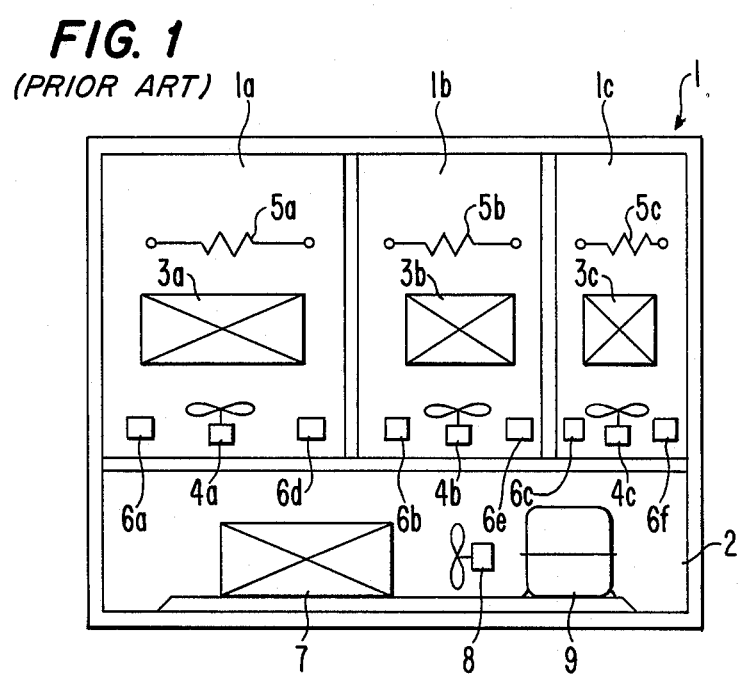
FIG. 1 is a diagrammatic sectional view of a prior art vending machine having a conventional refrigerating apparatus.
Figure 3:
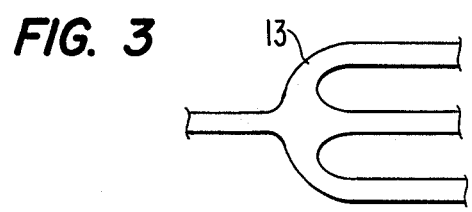
FIG. 3 is a diagrammatic view of a distributor used in the refrigerating circuit of FIGS. 2a and 2b.
Figure 4:
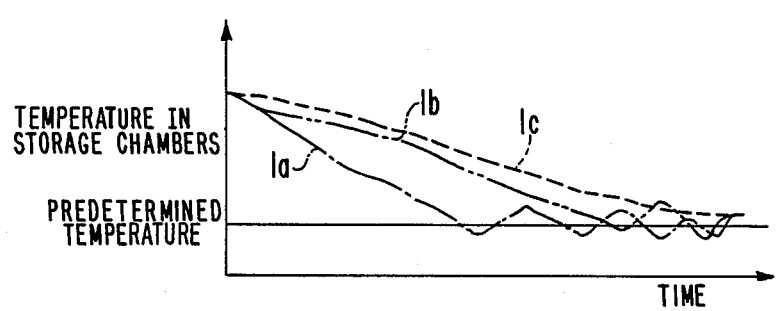
FIG. 4 is a graph illustrating the temperature in each chamber of the vending machine of FIG. 1.
Figure 2A:
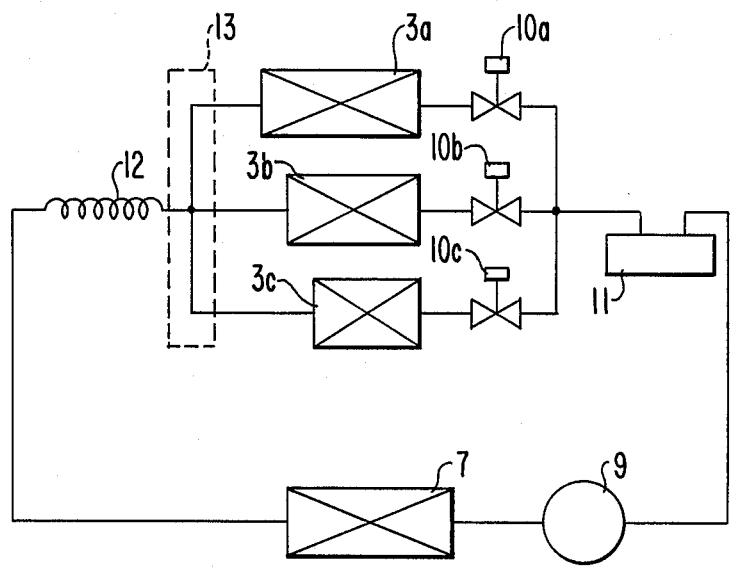
FIGS. 2a and 2b are views illustrating a refrigerating circuit used with the vending machine of FIG. 1.
Figure 2B:
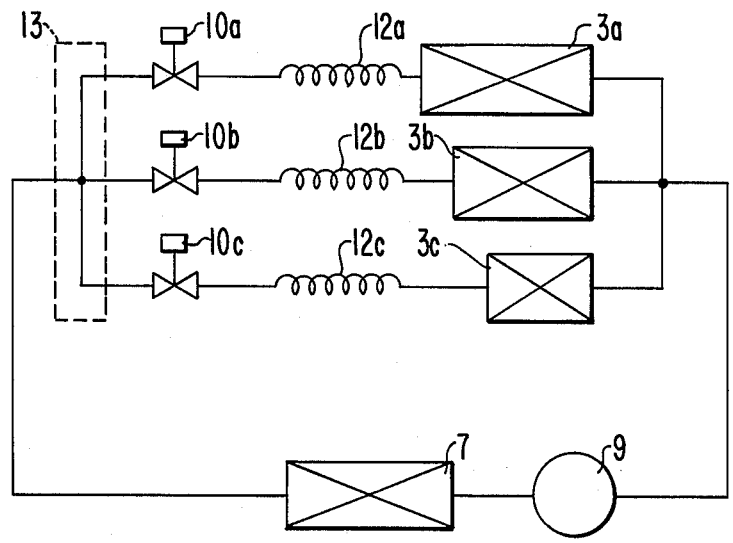
Figure 5:
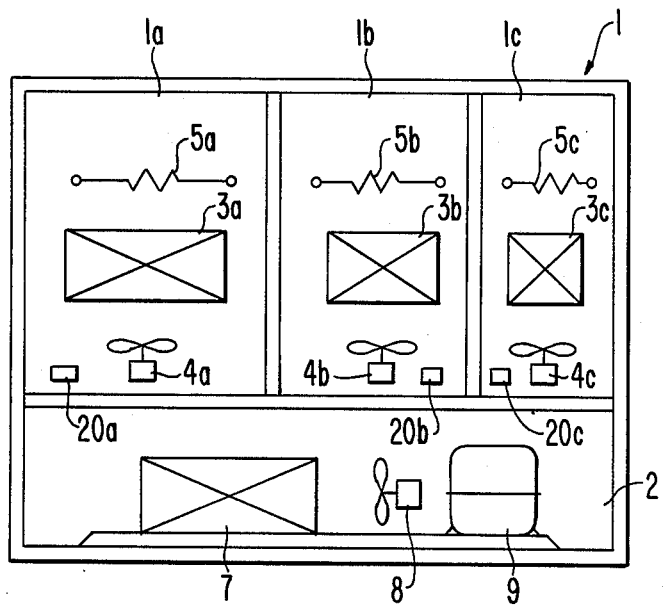
FIG. 5 is a diagrammatic sectional view of a vending machine having a temperature control means according to the present invention.

Referring to FIG. 5, a refrigerating apparatus according to the present invention is shown and comprises compressor 9, condenser 7, evaporators 3a,3b and 3c, serially connected electromagnetic valves 10a, 10b and 10c, and a decompression device (not shown). Vending machine 1 is internally divided into a plurality of merchandise storage chambers 1a,1b and 1c and mechanical chamber 2, in the same manner as shown in FIG. 1. The device is also interconnected in the same manner as the prior art device of FIGS. 2a and 2b.

Heater elements 5a, 5b and 5c are disposed in storage chambers 1a,1b and 1c, respectively and the air in each of these chambers is circulated by blowers or fans 4a,4b and 4c. The temperature in each storage chamber is controlled by the refrigerating apparatus and heater element 5 in accordance with the operation of thermistors 20a,20b and 20c.

Figure 6:
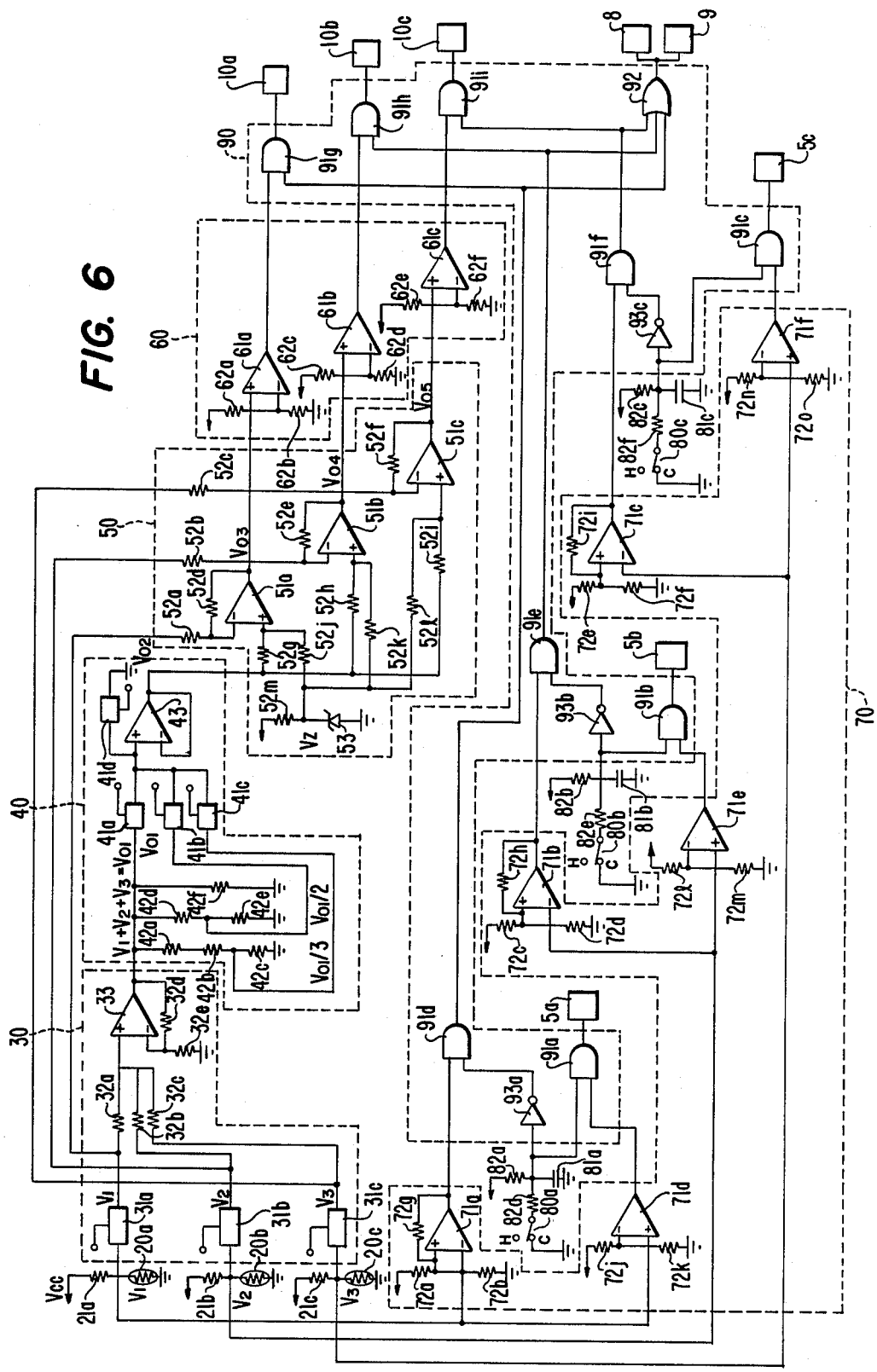
FIG. 6 is a circuit diagram of a temperature control device of the vending machine of FIG. 5.

Referring to FIG. 6, a circuit diagram of a control device for the refrigerating apparatus of this invention is shown. The control device comprises a plurality of negative characteristics thermistors 20a,20b and 20c disposed in each storage chamber of vending machine 1 (as shown in FIG. 5), adding circuit 30, voltage averaging circuit 40, differential amplification circuit 50, first and second comparison amplification circuits 60,70, a plurality of change-over switches 80a,80b, and 80c, driving circuit 90 and heating elements 5a,5b and 5c.

Each thermistor 20a,20b and 20c is connected to a power source through resistors 21a,21b and 21c respectively, and the output voltage of thermistors 20a,20b and 20c (V1,V2 and V3) is applied to adding circuit 30. Adding circuit 30 comprises a plurality of electrical switches 31a,31b and 31c, resistors 32a–32e and comparator 33. One terminal end of each electrical switch 31a,31b and 31c is connected to the non-inverting input terminal (+) of comparator 33 through resistor 32a,32b and 32c, respectively. The inverting input terminal (−) of comparator 33 is connected to the output terminal of comparator 33 through resistor 32d, and is grounded through resistor 32e. Therefore, the output terminal of comparator 33 outputs voltage $V_{O1}$ which is the sum of the output voltage of each thermistor (V1,V2 and V3).

Voltage $V_{O1}$ is applied to voltage averaging circuit 40 which comprises a plurality of resistors 42a–42f, four electrical switches 41a–41d and impedance transducer 43. The output terminal of comparator 33 of adding circuit 30 is connected to one terminal end of electrical switch 41a. Resistors 42a,42b and 42c are serially connected with one another, as are resistors 42d and 42e. These two serially connected resistor combinations and single resistor 42f are connected in parallel and are connected to the output terminal of comparator 33. The junction of resistors 42d and 42e is connected to one terminal end of electrical switch 41b. Since resistors 42d and 42e are equal, the voltage applied to second switch 41b is $V_{O1}/2$. The junction between resistors 42b and 42c is connected to one terminal end of electrical switch 41c and voltage $V_{O1}/3$ is applied to third switch 41c since the values of these resistors are also equal. The other terminal end of each switch 41a,41b and 41c is connected to the positive terminal (+) of transducer 43, and the negative terminal (−) of transducer 43 is connected to its output terminal. The positive terminal is also connected to one terminal end of electrical switch 41d, the other terminal of which is grounded, to control the operation of transducer 43.

The output voltage of transducer 43 ($V_{O2}$) is applied to the non-inverting input terminal (+) of each of three comparators 51a, 51b and 51c of differential amplification circuit 50, through resistors 52g, 52h, 52i, respectively. Differential amplification circuit 50 comprises, in addition to comparators 51a, 51b and 51c, a Zener diode 53 and a plurality of resistors 52a–52m. The inverting input terminal (−) of each of comparators 51a, 51b and 51c is connected with the other terminal end of electrical switches 31a,31b and 31c, respectively, of adding circuit 30 through resistors 52a, 52b and 52c, respectively, and is also connected with its output terminal. The non-inverting input terminal (+) of each comparator 51a, 51b and 51c is also connected with the junction of resistor 52m and Zener diode 53 through resistors 52j, 52k, and 52l, respectively. The resistance of resistors 52g, 52h, and 52i(First Group), which are disposed between the output terminal of impedance transducer 43 and the non-inverting input terminal (+) of comparators 51a, 51b and 51c is equal to the resistance of resistors 52a, 52b, and 52c(Second Group), which are disposed between the terminal end of the electrical switches of adding circuit 30 and the inverting input terminal (−) of comparators 51a, 51b and 51c. The resistance of resistors 52d, 52e, and 52f(Third Group), which are disposed between the output terminal and the inverting input terminal (−) of each of comparators 51a, 51b and 51c, is equal to the resistance of resistors 52j, 52k, and 52l(Fourth Group), disposed between the non-inverting input terminal (+) of comparators 51a, 51b and 51c and Zener diodes 53. Therefore, the output voltage of each comparator ($V_{O3}$, $V_{O4}$ and $V_{O5}$) is given by the following equations:

$$V_{O3} = R2/R1\,(V_{O2} - V_1) + V_z$$

$$V_{O4} = R2/R1\,(V_{O2} - V_2) + V_z$$

$$V_{O5} = R2/R1\,(V_{O2} - V_3) + V_z$$

wherein, R1 is resistance of the first and second groups of resistors, R2 is resistance of third and fourth groups of resistors and Vz is the voltage of the Zener diode.

Comparison amplification circuit 60 comprises comparators 61a,61b and 61c, and resistors 62a–62f. The output terminal of comparators 51a, 51b and 51c is connected to the non-inverting input terminal (+) of comparators 61a,61b and 61c, respectively. A reference voltage is applied to the inverting input terminal (−) of each comparator 61a,61b and 61c. Comparison amplification circuit 60 compares the output voltages $V_{O3}$, $V_{O4}$, $V_{O5}$ with this reference voltage and generates a control signal to each valve device. With reference to the equations for $V_{O3}$, $V_{O4}$, $V_{O5}$ and the circuit diagram of FIG. 6, it can be seen that the output voltage of each comparator (related to $V_{O3}$, $V_{O4}$, $V_{O5}$) is varied in accordance with changes in the actual temperature within an individual chamber (related to $V_1$, $V_2$, $V_3$). When one of these output voltages is below the reference voltage of comparator 61a, 61b, 61c, i.e. the actual temperature within an individual chamber is below the average temperature by a predetermined value, the corresponding comparator will output a low level signal and thereby discontinue the refrigeration of the corresponding chamber. On the other hand, if the temperature in an individual chamber exceeds the average temperature by a predetermined value, the corresponding comparator will output a high level signal and reactivate the refrigeration of the corresponding chamber.

Comparison amplification circuit 70, which generates the control signal for the refrigerating apparatus and heater element, comprises six comparators 71a–71f, and resistors 72a–72o. A predetermined voltage is applied to the non-inverting input terminal (+) of each of comparators 71a,71b and 71c, and is also applied to the inverting input terminal (−) of each of comparators 71d,71e and 71f. The variable voltage in the thermistors (V1, V2 and V3) is applied to the inverting input terminal (−) of comparators 71a,71b and 71c and to the non-inverting input terminal (+) of comparators 71d,71e and 71f. Therefore, the output of comparators 71a–71f changes in accordance with the temperature in each of the storage chambers.

A change over switching circuit comprises change over switches 80a,80b and 80c which consists of one-pole double throw switches, resistors 82a–82f, and condensers 81a–81c. Each of switches 80a,80b and 80c comprises one common terminal connected to resistors 82d, 82e and 82f, respectively, and two alternative terminals, one of which is grounded and referred to as cooling point C. The other terminal is an open circuit and is referred to as heating point H.

Driving circuit 90 controls the operation of both the refrigerating apparatus and the heater elemet, and comprises AND gates 91a–91i,OR gate 92 and inverters 93a,93b, and 93c. AND gates 91a,91b and 91c control the operation of heater elements 5a, 5b and 5c in response to one output signal from comparators 71d,71e and 71f and the change-over switching circuit. In other words, the condition of the output signal of AND gates 91a,91b and 91c depends upon the heating condition in each chamber. AND gates 91d,91e and 91f control the operation of the refrigerating apparatus in response to the output signal from comparators 71a, 71b and 71c and the change-over switching circuit.

The output signals of AND gates 91d,91e and 91f are applied to AND gates 91g,91h, and 91i, respectively, and to OR gate 92. The output signals from the comparators of amplification circuit 60 is also applied to these AND gates. The output signal of AND gates 91g,91h, and 91i control the operation of electromagnetic valves 10a,10b and 10c, respectively, to thereby control the refrigerating operation in each storage chamber. The output signal from OR gate 92 controls the operation of compressor 9 and blower 8 of the refrigerating apparatus.

In the above described control device, the electrical switches 31a,31b and 31c of adding circuit 30 are normally closed when the refrigerating apparatus is active or when the temperature in each storage chamber has not reached the predetermined temperature when the chamber is being heated. If three evaporators are used for refrigerating all of the storage chambers, electrical switches 41a,41b and 41d are open. If two of the three evapoators are used, electrical switch 41b is the only closed switch. Furthermore, if one of the three evaporators is only used for refrigerating one of the storage chambers, electrical switch 41a is the only closed switch. When the operation of the refrigerating apparatus ceases, electrical switch 41d is the only closed switch.

During the operation of the control device, if change-over switches 80a,80b and 80c are selected to operate the refrigerating mode, a low level signal is input into inverters 93a,93b and 93c and, in the initial stage, comparators 71a,71b and 71c output a high level signal since the temperature in each storage chamber exceeds the predetermined temperature. As a result, a high level signal will be input into AND gates 91g,91h and 91i through AND gates 91d,91e and 91f.

The voltage in each thermistor (V1,V2,V3) is added by adding circuit 30, and the average voltage (VO2) representing the average temperature in the storage chambers is output from voltage averaging circuit 40. At the initial stage for the refrigerating operation, this average voltage exceeds the reference voltage, and comparators 61a,61b and 61c output a high level signal. Thus, AND gates 91g,91h and 91i and OR gate 92 output a high level signal, to thereby fully operate the refrigerating apparatus to refrigerate each storage chamber.

As the refrigerating operation progresses, if the temperature in one of the storage chambers 1b drops below the reference temperature, the output signal from comparator 61b changes to a low level signal. Thus, the output signal from AND gate 91h changes to a low level signal. As a result, the electromagnetic valve 10b is closed to cease the flow of refrigerant into evaporator 3b. Thus, the refrigerating operation in storage chamber 1b is stopped. Similarly, when the temperature in storage chamber 1c drops below the reference temperature, the output signal from comparator 61c changes to a low level signal, the output signal of AND gate 91i changes to a low level signal and the operation of electromagnetic valve 10c ceases. The refrigerating operation in storage chamber 1c is thereby stopped.

After the refrigerating operation in one of the storage chambers is stopped, if the temperature in a storage chamber again exceeds the reference temperature, the output signal from the appropriate AND gate, i.e, 91h,91i, changes to a high level signal to restart the refrigerating operation. The refrigerating operation will cyclically continue until the temperature in each storage chamber reaches the predetermined temperature. When all of the storage chambers reach the predetermined temperature, operation of compressor 9 and ventilating fan 8 is also ceased.

On the other hand, if change-over switches 80a, 80b and 80c are selected to a heating mode, a high level signal is applied to inverters 93a,93b and 93c. Therefore, AND gates 91d,91e and 91f output a low level signal and cease the operation of the refrigerating apparatus. In the initial stage of the heating operation, the temperature in each storage chamber is below the predetermined temperature, and comparators 71d,71e and 71f will be outputting a high level signal. As a result, heater elements 5a, 5b and 5c will operate to heat the storage chambers. When the temperature in a storage chamber exceeds the predetermined temperature, the corresponding comparator will output a low level signal to cease the operation of the heater element. Since the refrigerating or heating mode in each chamber is selected by change-over switches 80a,80b and 80c a refrigerating chamber and a heating chamber can coexist within on vending machine.

Figure 7:
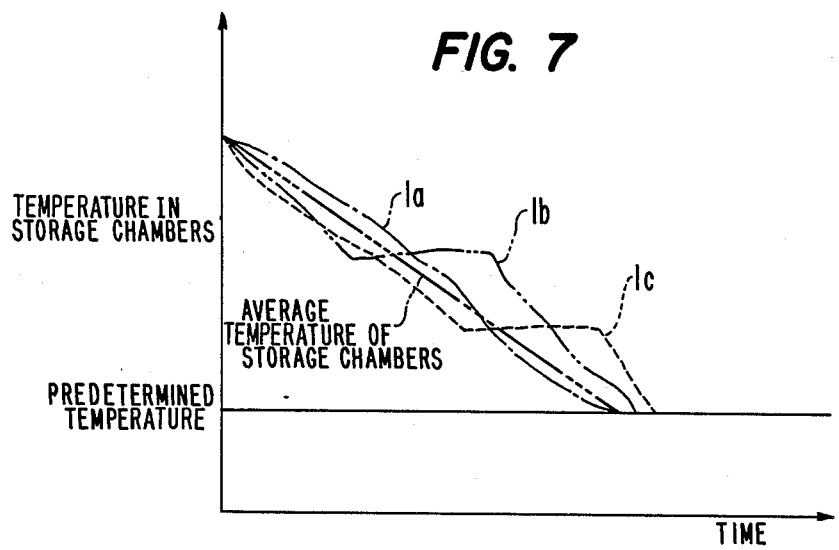
FIG. 7 is a graph illustrating the temperature in each chamber of the vending machine of FIG. 5.

As mentioned above, the refrigerating operation in each storage chamber is intermittently controlled in accordance with the relationship between the actual temperature of the storage chambers, and the average temperature of the storage chambers so that each storage chamber is able to be uniformly refrigerated. These temperature conditions in each storage chamber are shown in FIG. 7. In the event that there is an unequal refrigerant flow in the refrigerating apparatus, the refrigerating operation will still progress uniformly since the chamber that has a large amount of refrigerant inflow will quickly drop too far below the average temperature and the cooling operation will cease until the remaining chambers cool down.

This invention has been described in detail in connection with a preferred embodiment. This embodiment, however, is merely for illustrative purposes only and the invention is not restricted thereto. It will be understood by those skilled in the art that other variations and modifications can be made within the scope of this invention, as defined by the appended claims.

What is claimed is:

1. A temperature control device for a vending machine having a plurality of storage chambers containing merchandise to be dispensed, said temperature control device comprising:
   means for refrigerating the interiors of each of the storage chambers;
   means for indicating the temperature within each of the storage chambers;
   means for calculating the average temperature within the storage chambers;
   means for comparing said average temperature with said temperature within each of the storage chambers; and
   means for discontinuing the refrigeration of an individual chamber if said average temperature exceeds the temperature within said individual chamber by a predetermined value.

2. A temperature control device according to claim 1 further comprising means for reactivating the refrigeration of said individual chamber if the temperature in said individual chamber exceeds said avearge temperature by a second predetermined value.

3. A temperature control device according to claim 2 further comprising means for discontinuing the refrigeration of all of the storage chambers of said average temperature is below a predetermined value.

4. A temperature control device for a vending machine having a plurality of storage chambers containing merchandise to be dispensed, said temperature control device comprising:
   means for refrigerating the interiors of each of the storage chambers;
   means for heating the interiors of each of the storage chambers;
   means for selectively switching between said means for refrigerating and said means for heating;
   means for indicating the temperature within each storage chamber;
   means for calculating the average temperature within the storage chambers;
   means for comparing the average temperature with the temperature within each of the storage chambers;
   means for discontinuing the refrigeration of a chamber selected to be refrigerated if the average temperature exceeds the temperature within said refrigerated chamber by a predetermined value; and
   means for discontinuing the heating of a chamber selected to be heated if the temperature within said heated chamber exceeds a predetermined temperature.

5. A temperature control device according to claim 4 further comprising means for reactivating the refrigeration of said refrigerated chamber if the temperature within said refrigerated chamber exceeds the average temperature by a second predetermined value.

6. A temperature control device according to claim 4 further comprising means for discontinuing the refrigeration of all refrigerated storage chambers if the average temperature is below a predetermined value.

* * * * *